(12) United States Patent
Brandenburger

(10) Patent No.: US 7,055,831 B2
(45) Date of Patent: Jun. 6, 2006

(54) HYDROPNEUMATIC, LEVEL-REGULATED AXLE SUSPENSION ON VEHICLES, IN PARTICULAR FOR FULL-SUSPENSION VEHICLES

(75) Inventor: Walter Brandenburger, Neuss (DE)

(73) Assignee: Carl Freudenberg KG, Weinheim (DE)

( * ) Notice: Subject to any disclaimer, the term of this patent is extended or adjusted under 35 U.S.C. 154(b) by 0 days.

(21) Appl. No.: 10/081,517

(22) Filed: Feb. 21, 2002

(65) Prior Publication Data

US 2002/0125654 A1 Sep. 12, 2002

(30) Foreign Application Priority Data

Mar. 12, 2001 (DE) .......................... 101 12 082

(51) Int. Cl.
*B60G 21/06* (2006.01)

(52) U.S. Cl. .................... 280/5.504; 280/124.106; 280/124.159

(58) Field of Classification Search ... 280/5.504–5.507, 280/124.159, 124.16, 6.154, 6.159, 5.514, 280/124.106, 124.158
See application file for complete search history.

(56) References Cited

U.S. PATENT DOCUMENTS

| | | | | |
|---|---|---|---|---|
| 2,184,202 A | * | 12/1939 | Tschanz | 280/5.506 |
| 2,973,969 A | * | 3/1961 | Thall | 280/5.517 |
| 2,976,052 A | * | 3/1961 | Hanna | 280/5.503 |
| 2,984,501 A | * | 5/1961 | Mercier | 280/5.508 |
| 3,606,374 A | * | 9/1971 | Capgras | 280/6.159 |
| 3,752,497 A | * | 8/1973 | Enke et al. | 280/5.509 |
| 4,152,004 A | * | 5/1979 | Schroder | 280/6.154 |
| 4,270,771 A | * | 6/1981 | Fujii | 280/5.514 |
| 4,277,085 A | * | 7/1981 | Bryansky et al. | 280/5.507 |
| 4,664,410 A | * | 5/1987 | Richard | 280/5.504 |
| 5,087,073 A | * | 2/1992 | Lund | 188/266.2 |
| 5,116,077 A | * | 5/1992 | Karnopp et al. | 280/5.502 |
| 5,271,632 A | * | 12/1993 | Glaser et al. | 280/6.154 |
| 5,338,010 A | * | 8/1994 | Haupt | 267/64.16 |
| 5,480,188 A | * | 1/1996 | Heyring | 280/124.104 |
| 5,538,266 A | * | 7/1996 | Martin et al. | 280/6.154 |
| 5,547,211 A | * | 8/1996 | Runkel | 280/6.159 |
| 5,566,970 A | * | 10/1996 | Lin | 280/124.106 |
| 5,642,282 A | * | 6/1997 | Sonehara | 701/37 |
| 5,682,980 A | * | 11/1997 | Reybrouck | 280/5.504 |
| 5,709,394 A | * | 1/1998 | Martin et al. | 280/6.154 |
| 5,794,966 A | * | 8/1998 | MacLeod | 280/5.507 |
| 5,899,472 A | * | 5/1999 | Burke et al. | 280/124.106 |
| 5,919,240 A | * | 7/1999 | Ney et al. | 701/37 |
| 6,010,139 A | * | 1/2000 | Heyring et al. | 280/124.104 |
| 6,092,816 A | * | 7/2000 | Sekine et al. | 280/6.159 |
| 6,179,310 B1 | * | 1/2001 | Clare et al. | 280/124.159 |
| 6,394,238 B1 | * | 5/2002 | Rogala | 188/266.2 |
| 6,752,403 B1 | * | 6/2004 | Allen et al. | 280/6.157 |

FOREIGN PATENT DOCUMENTS

| | | |
|---|---|---|
| DE | 15 80 793 | 12/1970 |
| DE | 33 01 847 | 10/1984 |
| DE | 34 27 508 | 2/1986 |
| DE | 34 27 508 | 2/1996 |
| EP | 0 730 988 | 6/1996 |
| EP | 0 783 984 | 7/1997 |
| FR | 1 301 331 | 12/1962 |
| WO | WO 90/10551 | 9/1990 |

* cited by examiner

*Primary Examiner*—Paul N. Dickson
*Assistant Examiner*—Laura B. Rosenberg
(74) *Attorney, Agent, or Firm*—Kenyon & Kenyon

(57) ABSTRACT

A hydropneumatic, level-regulated axle suspension for the front wheel axle and rear wheel axle on vehicles, in particular vehicles whose large axle load spread is large, having two double-acting hydraulic suspension cylinders, whose cylinder spaces are each connected to a first accumulator and whose annuli on the piston side are connected to a second accumulator, the axle suspension for the front axle (39) and the rear axle (40) being designed as a reversible double-function axle suspension, so that each axle (39, 40) is switchable both as an oscillating axle (in the cylinder transverse combination) and as a stabilizing axle (in the cross combination).

15 Claims, 4 Drawing Sheets

HYDROPNEUMATIC, LEVEL-REGULATED AXLE SUSPENSION ON VEHICLES, IN PARTICULAR FOR FULL-SUSPENSION VEHICLES

BACKGROUND OF THE INVENTION

1. Field of the Invention

The invention relates to the axle suspension of vehicles, in particular vehicles having large axle load spreads, such as in the case of tractors in agriculture.

2. Description of Related Art

These vehicles have an extremely varied range of applications. It would therefore be desirable for them to be able to travel greater distances very rapidly on improved roads. They should be able to travel safely and comfortably at a high speed and they should have a suspension adapted to this. On the other hand, they should be suitable for use over difficult terrain, have a good rolling stability with a good load distribution to the wheels for optimal utilization of the tractor power and to reduce the ground contact forces.

Conventional embodiments in the past have provided for the tractor to be designed so that a stable three-point support is created. The rear axle, which forms a two-point support through the support of the wheels, in combination with an oscillating front axle, which represents the third support point at the center of the axle, has a rigid design.

The three-point principle with a rigid axle permits very good operating conditions with good rolling stability in the field. In driving on the road, however, driving performance and driving comfort are limited by a rigid axle.

SUMMARY OF THE INVENTION

It is an object of the invention to create a suspension which will allow higher driving speeds for tractors with greater safety and driving comfort when driving on the road without restricting the driving performance of the three-point support which has proven successful in the field.

These and other objects of the invention are achieved for a hydropneumatic, level-regulated suspension, in particular with a full suspension on vehicles having a great axial load spread with two double-acting hydraulic suspension cylinders each on the front and rear axles whose cylinder spaces in the accumulator combination form a first suspension circuit and whose piston-side annular spaces in another accumulator combination form a second suspension circuit, by the fact that the axle suspension for the front and rear axles is designed as a reversible double-function axle suspension, so that each axle is switchable both as an oscillating axle (in the transverse combination) and as a stabilizing axle (in the cross combination). Consequently, the axle suspensions are designed so that they may function as an oscillating axle or as a stabilizing axle as needed, i.e., the rear wheel axle is also switchable as an oscillating axle, and the front wheel axle is also switchable as a stabilizing axle. With such a design of the tractor axles, the rear wheel axle may be switched for driving on the road or for field work as a stabilizing axle in the traditional manner, while the front axle functions as an oscillating axle. The suspension of the stabilizing axle may optionally be blocked for field work, which results in the support points for the tractor body work being shifted further outward, thus achieving the rolling stability of a rigid axle.

BRIEF DESCRIPTION OF THE DRAWINGS

The present invention will be described in greater detail with reference to the following drawings wherein.

DETAILED DESCRIPTION OF THE INVENTION

Figure 1:
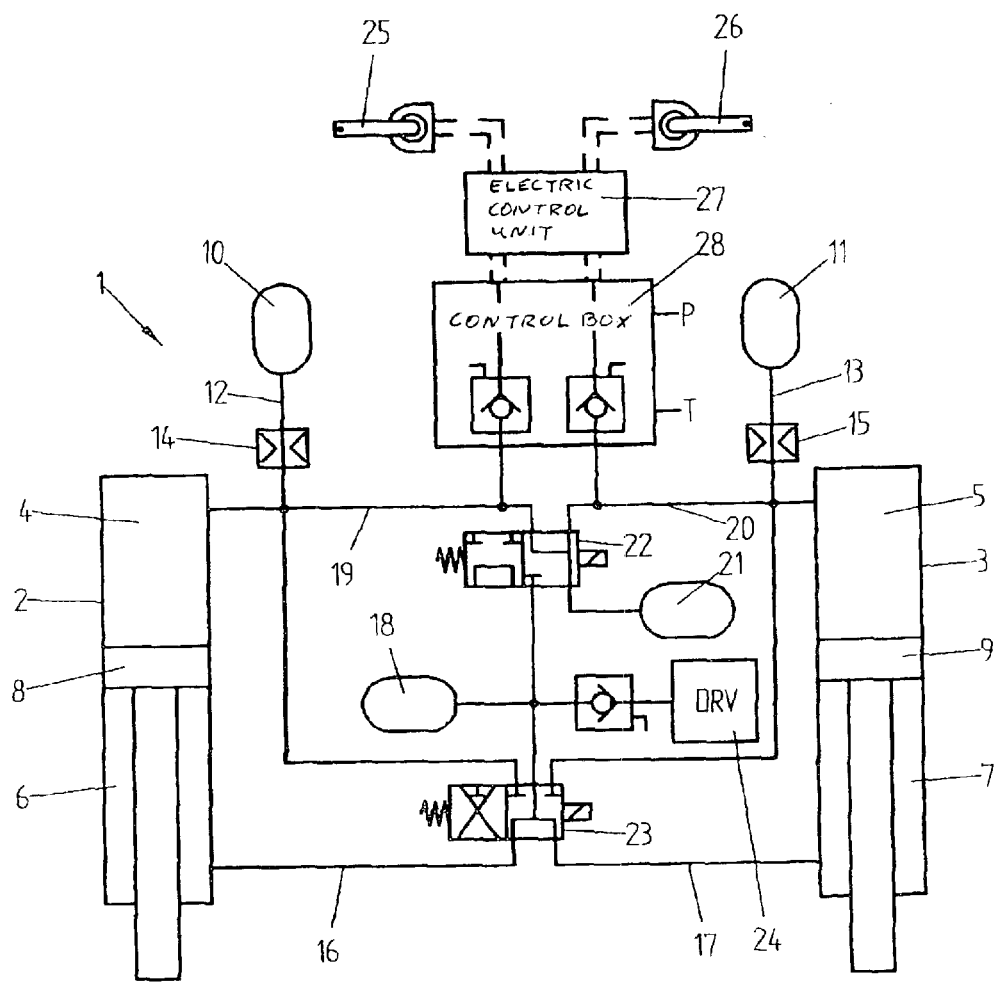
FIG. 1 shows a schematic circuit diagram having switching for oscillating function.

If the front axle is loaded with a very high weight in front load work, it would be desirable for the front axle to be stabilized. In driving on the road, it is more advantageous for the front and rear axles to be able to act as stabilizing axles at the same time in some load cases for the purpose of reinforcing the rolling stability. There is an unlimited parallel suspension on both axles, however, with a somewhat less favorable load distribution than in the case of a pure three-point support. In the other embodiment of the present invention, there is a three-point support in the case of great load differences between the axles by switching one axle as an oscillating axle and the other as a stabilizing axle. In the preferred case, the axle having the low load is switched to the oscillating function and the axle having the high load has the stabilizing function.

In switching of the axle functions between the front and rear axles, either the suspension of at least one axle is blocked briefly or both axles are switched to the stabilizing function to prevent heeling in the transition. The axle function is switchable only in the case of an axle load where the cylinder and annulus pressures have almost the same pressure level, so that pressure and accumulator connections may be changed under pressure without any problematical change in level or other problems. With conventional types of tractors, the construction dimensions of the suspension cylinders are coordinated so that the switching pressure level is approx. 75 bar, for example. In this case, the annulus pressure is regulated by a pressure regulating valve and the pressure in the cylinder space of the suspension accumulator is determined by the axial load.

In the case of an oscillating function in the transverse combination, the axle load is supported on the cylinder surfaces, and in the case of axial stabilization in the cross combination, the suspension cylinders are functioning as plunger cylinders, so that the piston rod cross section here functions as a supporting surface. This results in a definite difference in the quantities of hydraulic oil to be received and delivered by the suspension accumulators during oscillation. In switching from oscillating function to stabilizing function, the cylinder space and annulus of an axle are switched in cross combination, and the accumulator in the annulus suspension circuit as well as the accumulator volume in the cylinder suspension circuit are isolated to counteract a drop in the spring rate because of the reduced quantities of hydraulic oil. In the case of any level correction, the accumulators that are isolated are kept at the pressure level designed for switching by the pressure regulating valve which regulates the annulus pressure in the oscillating function, so that automatic switching of the axle functions is possible.

For level regulating, an electric level regulator whose signals activate solenoid valves for controlling the hydraulic regulating functions is assigned to each suspension cylinder. In the case of the oscillating, both level regulators of an axle are switched in combination, and in the case of stabilization, the level of each suspension cylinder is regulated separately over the respective level regulator.

An additional possibility for optimizing the driving performance is provided by shock absorber elements which are inserted into the connecting line between the cylinder space and the pressure accumulator.

The principle of the double-function axle also offers the economic advantage that axles of the same design may be used for the front and rear axles. FIG. 1 shows a circuit diagram 1 of the double-function axle in the oscillating function. Double-action hydraulic suspension cylinders 2 and 3 have cylinder spaces 4 and 5 and annuli 6 and 7. Cylinder spaces 4 and 5 are separated from annuli 6 and 7 by pistons 8 and 9. Cylinder spaces 4 and 5 are each connected to an accumulator 10 and 11 over lines 12 and 13. Hydraulic shock absorber elements 14 and 15 are inserted into connecting lines 12 and 13, to damp the flow of hydraulic fluid. Annuli 6 and 7 are connected to accumulator 18 over lines 16 and 17, while cylinder spaces 4 and 5 are connected to additional accumulator 21 over lines 19 and 20. Valves 22 and 23 are energized in the position shown here and establish the connection between cylinder spaces 4 and 5 and accumulators 21, 10 and 11 and also the connection between annuli 6 and 7 and accumulator 18. Valves 22 and 23 are controlled externally by switches or automatically as a function of the load via signals from pressure sensors in cylinder spaces 4 and 5 in that primarily only the axle having the lower load is switched to the oscillating function according to FIG. 1. Pressure-regulating valve 24 regulates the annulus pressure required at high load ratios. If the pressure level of the cylinder and annulus is approximately balanced, switching may be accomplished by zero current switching of solenoid valves 22 and 23, resulting in a cross combination between cylinder spaces 4 and 5 and annuli 6 and 7 and thus switching from the function of the oscillating axle to the function of the stabilizing axle.

The general level regulation of the axle suspension is accomplished in the known way by electric level regulators 25 and 26 which are connected to electric control unit 27, which in turn controls control block 28 for the supply and removal of hydraulic medium. The signals of the two level regulators are processed electronically to yield a uniform control signal without taking into account the oscillating motion in the case of an oscillating function.

Figure 2:
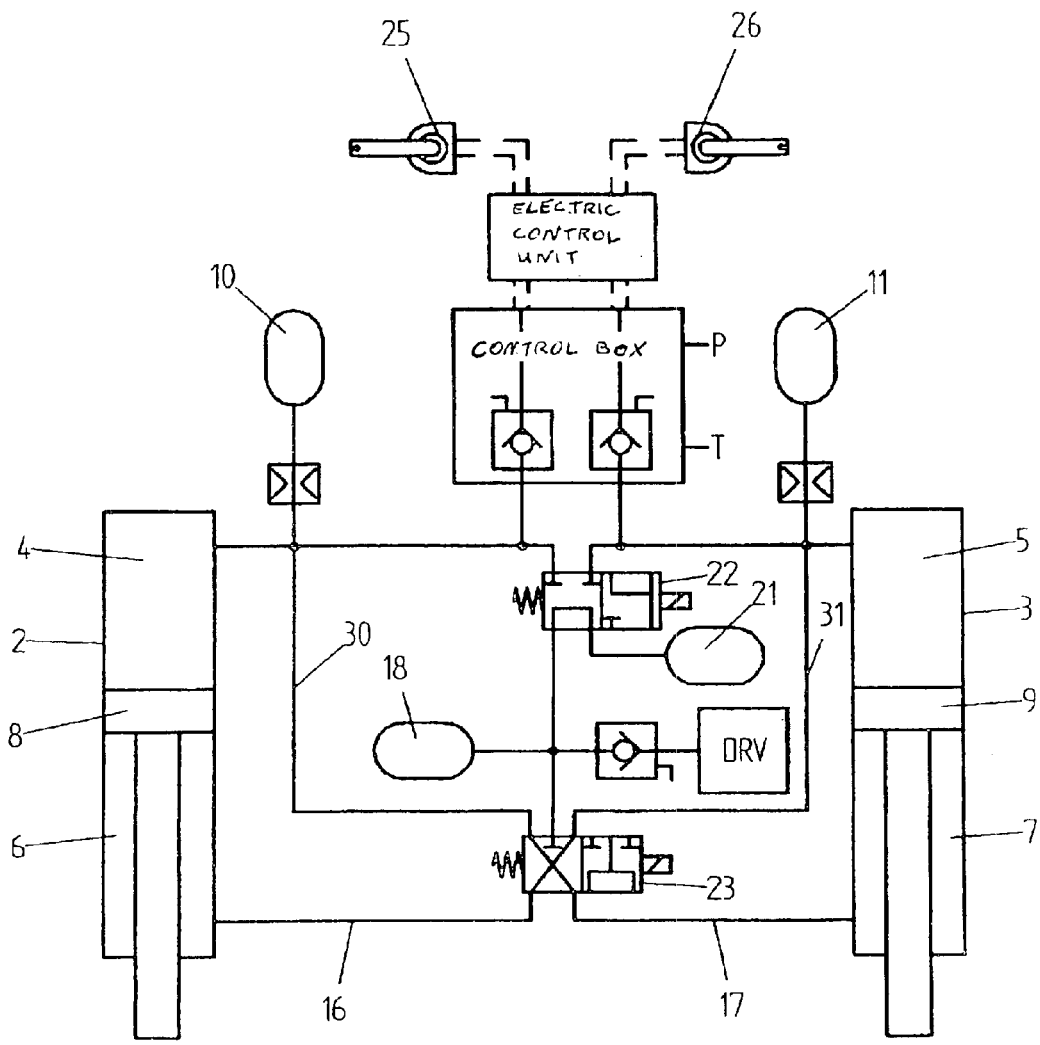
FIG. 2 shows the circuit diagram after switching to stabilizing function.

FIG. 2 shows the wiring diagram of the double-function axle in the stabilizing function in which control valves 22 and 23 are not energized and a cross combination has been established between cylinder spaces 4 and 5 and annuli 6 and 7. Accumulator 18 is separated from annuli 6 and 7 by de-energized valve 23, and the annuli are connected to cylinder spaces 4 and 5 by cross connection. De-energized solenoid valve 22 interrupts the transverse combination on the cylinder side, isolates accumulator 21 from the cylinder suspension circuit and connects accumulator 21 hydraulically to accumulator 18. Cylinder space 4 is connected to annulus 7 over lines 30 and 17. Cylinder space 5 is in turn connected to annulus 6 via lines 31 and 16. Accumulator 10 in combination with suspension cylinder spaces 4 and 7 forms the left suspension circuit, and accumulator 11 together with cylinder spaces 5 and 6 forms the right suspension circuit. Accumulators 18 and 21 which are connected in the combination are inactive in the case of oscillation in the cross combination. They are regulated or held by the pressure regulating valve at the fixed switching pressure in the case of any level correction. The level of the left suspension circuit is regulated by level regulator 25, and the level of the right circuit is regulated separately by regulator 26, so that inclined positions are corrected statically. In the case of a parallel oscillation, the piston rods of the suspension cylinders act on accumulators 10 and 11 separately with their displacement quantities in the same direction of flow. In the case of rolling, however, the larger piston displacement quantities are in effect in the opposite direction of flow through the cross combination having the stabilizing effect of a transverse stabilizer due to the fact that the suspension circuit of the compression side absorbs much higher supporting forces in comparison with parallel suspension with a shorter spring path because of the larger quantities of oil and the supporting force of the expansion side is greatly reduced.

Figure 3:
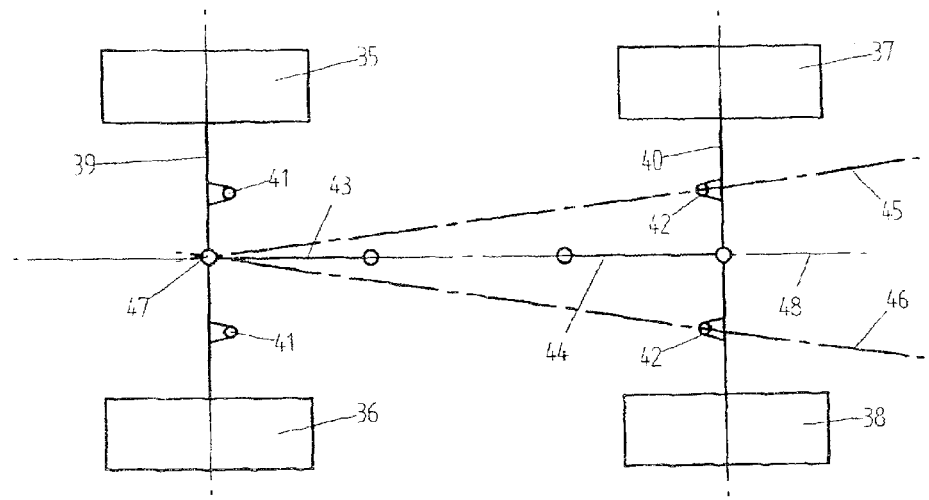
FIG. 3 shows a three-point support using a rear axle stabilization for driving on the road.

FIG. 3 shows schematically the three-point principle of the tractor design having front axle 39 and rear axle 40. Front wheels 35 and 36 and rear wheels 37 and 38 are each connected by a double-function axle 39 and 40. Axles 39 and 40 are provided with bearing supports 41 on front wheel axle 39 and bearing supports 42 on rear axle 40. The piston rods of suspension cylinders 2, 3 act on these supports 41, 42. Each axle 39, 40 is also equipped with longitudinal control arms 43 and 44. Dash-dot lines 45 and 46 indicate the support of the tractor bodywork with the elastic suspension as a three-point support. In this embodiment, rear axle 40 is switched as a stabilizing axle according to FIG. 2. The axle load is held oscillatingly by suspension cylinders 2, 3 of rear wheel axle 40 acting on supports 42. Front wheel axle 39, however, is switched as an oscillating axle, so that it is possible to oscillate about fulcrum 47. Suspension cylinders 2, 3 of front axle 39 act at points 41 and allow the oscillating movement. With this switching, the tractor is highly suitable for driving on the road. However, it is also capable of field work. The distance between respective bearing supports 41, 42 and center line 48 of the tractor is the same.

Figure 4:
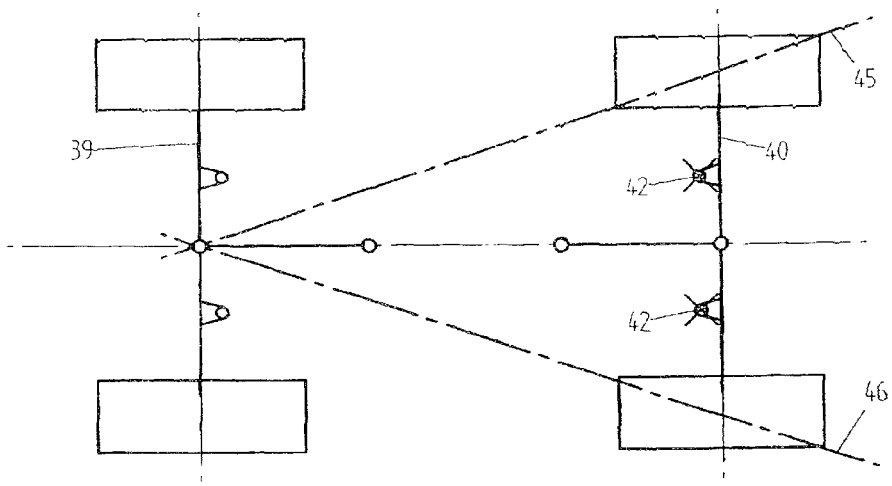
FIG. 4 shows a rear axle stabilization with blocked suspension for field work.

If maximum rolling stability of a rigid rear axle is required for field work, the oscillation on suspension cylinders 2, 3 is blocked for this case in FIG. 4, which results in a greater spread in dash-dot lines 45 and 46 and thus an outward displacement of the support points of the tractor weight. This blocking may be accomplished by isolating the suspension accumulators or by moving the axle into the stops with optional additional locking.

Figure 5:
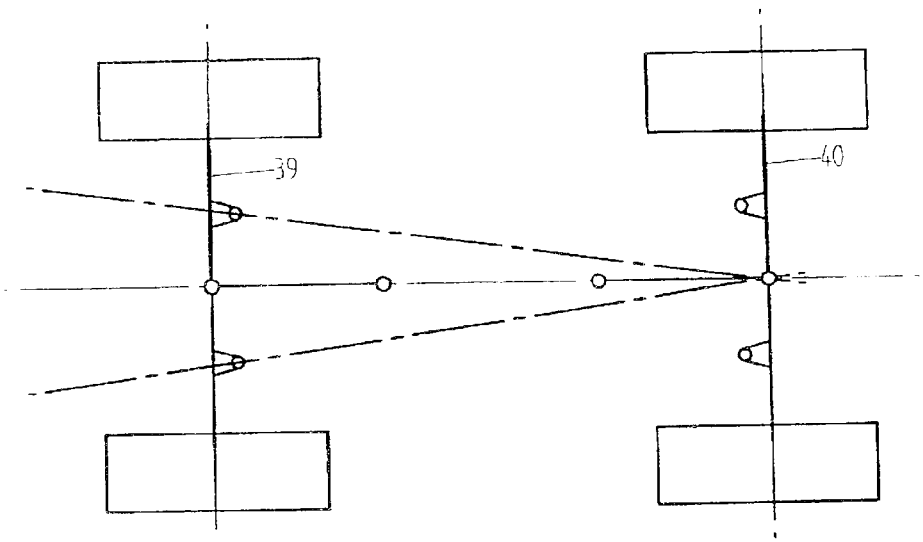
FIG. 5 shows a front axle stabilization with large loads on the front axle.
Figure 6:
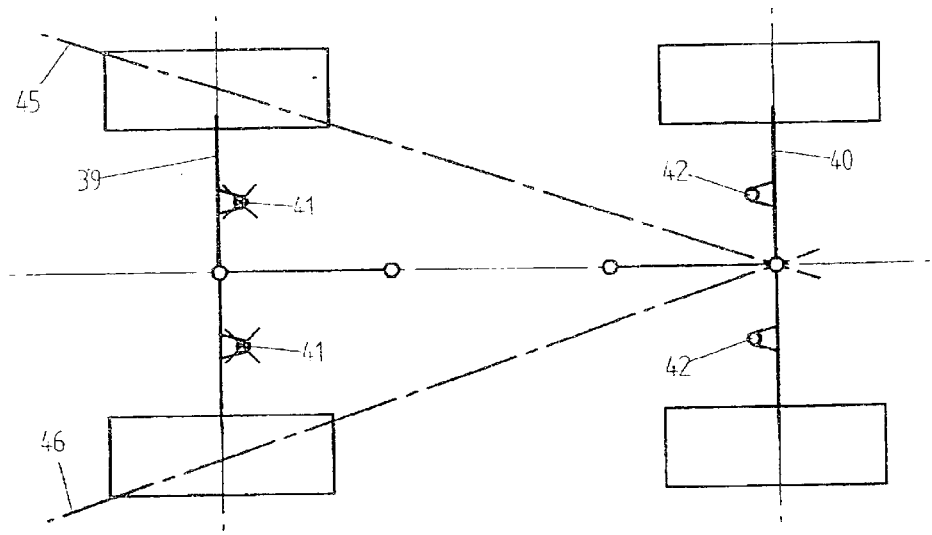
FIG. 6 shows a front axle stabilization with blocked suspension.

FIGS. 5 and 6 illustrate schematically the tractor according to FIGS. 3 and 4, with the difference that rear axle 40 is switched as an oscillating axle and front axle 39 is switched as a stabilizing axle. The circuit according to FIG. 5 is suitable in particular for driving with a very high load on front axle 39, while the circuit according to FIG. 6 shows the spread of axle load lines 45 and 46, which is achieved when the oscillation on bearing supports 41 is blocked.

What is claimed is:

1. A hydropneumatic, level-regulated axle suspension for front and rear axles on vehicles, comprising: two double-acting hydraulic suspension cylinders, whose cylinder spaces are each connected to a first pressure accumulator and whose annuli on a piston side are connected to a second pressure accumulator, wherein the axle suspension for the front axle (39) and the rear axle (40) is designed as a reversible double-function axle suspension, so that each axle (39, 40) is switchable (i) as an oscillating axle in a cylinder transverse combination in which the cylinder spaces on a given axle communicate and the annuli on the same axle communicate, or (ii) as a stabilizing axle in a cross combination in which the cylinder space of each cylinder on a given axle communicates with the annulus of the other cylinder on the same axle;

wherein the rear axle of the vehicle is switched as the stabilizing axle and the front axle of the vehicle is switched as an oscillating axle when there is a lower axle load on the front axle of the vehicle, and the rear axle is switched as an oscillating axle and the front axle of the vehicle is switched as the stabilizing axle when there is a lower axle load on the rear axle of the vehicle.

2. The axle suspension according to claim 1, wherein the switching is alternating, so that switching one axle as an oscillating axle results in simultaneous switching of the other axle as a stabilizing axle.

3. The axle suspension according to claim 1, wherein the axle suspension of the stabilizing axle is blocked by isolating the suspension accumulator.

4. The axle suspension according to claim 1, wherein the cylinder spaces (4, 5) of the suspension cylinders (2, 3) of an axle (39, 40) are each connectable to a separate accumulator (10, 11).

5. The axle suspension according to claim 4, wherein the cylinder spaces (4, 5) of the suspension cylinders (2, 3) are connectable to an additional accumulator (21).

6. The axle suspension according to claim 5, wherein the annuli (6, 7) of the suspension cylinders (2, 3) are connectable to a common accumulator (18).

7. The axle suspension according to claim 4, wherein the annuli (6, 7) of the suspension cylinders (2, 3) are connectable to a common accumulator (18).

8. The axle suspension according to claim 1, wherein the cylinder space (4, 5) of one suspension cylinder (2, 3) and communicating accumulator (10, 11) are connectable to the annulus (7, 6) of the other suspension cylinder (3, 2).

9. The axle suspension according to claim 8, wherein the accumulator (18) of the annuli (6, 7) and the additional accumulator (21) of the cylinder spaces (4, 5) are blocked.

10. The axle suspension according to claim 1, wherein hydraulic shock absorber elements (14, 15) are inserted into connecting lines (12, 13) to the accumulators (10, 11).

11. The axle suspension according to claim 1 wherein the switching is done at approximately the same pressures in the cylinder spaces (4, 5) and in the annuli (6, 7) of the same suspension cylinders (2, 3).

12. The axle suspension according to claim 1, wherein the design of front and rear axle suspensions is identical.

13. The axle suspension according to claim 1, wherein blocked accumulators (18 and 21) are regulated and kept at a switchover pressure level by a pressure regulating valve (24).

14. A hydropneumatic, level-regulated axle suspension for front and rear axles on vehicles, comprising: two double-acting hydraulic suspension cylinders, whose cylinder spaces are each connected to a first pressure accumulator and whose annuli on a piston side are connected to a second pressure accumulator, wherein the axle suspension for the front axle (39) and the rear axle (40) is designed as a reversible double-function axle suspension, so that each axle (39, 40) is switchable (i) as an oscillating axle in a cylinder transverse combination in which the cylinder spaces on a given axle communicate and the annuli on the same axle communicate, or (ii) as a stabilizing axle in a cross combination in which the cylinder space of each cylinder on a given axle communicates with the annulus of the other cylinder on the same axle;

wherein switching from oscillating axle suspension to stabilizing axle suspension is done as a function of the pressure in the cylinder spaces (4, 5).

15. A hydropneumatic, level-regulated axle suspension for front and rear axles on vehicles, comprising: two double-acting hydraulic suspension cylinders, whose cylinder spaces are each connected to a first pressure accumulator and whose annuli on a piston side are connected to a second pressure accumulator, wherein the axle suspension for the front axle (39) and the rear axle (40) is designed as a reversible double-function axle suspension, so that each axle (39, 40) is switchable (i) as an oscillating axle in a cylinder transverse combination in which the cylinder spaces on a given axle communicate and the annuli on the same axle communicate, or (ii) as a stabilizing axle in a cross combination in which the cylinder space of each cylinder on a given axle communicates with the annulus of the other cylinder on the same axle;

wherein the axle (39, 40) may be at least one of secured and pressed against stops for the purpose of blocking the suspension.

* * * * *